United States Patent [19]

Bowes et al.

[11] 4,238,328

[45] Dec. 9, 1980

[54] PROCESS FOR REMOVING HEAVY-METAL IONS FROM AQUEOUS SOLUTIONS

[75] Inventors: Quentin Bowes, Allschwil; Rudolf F. Wurster, Pfeffingen, both of Switzerland

[73] Assignee: Ciba-Geigy Corporation, Ardsley, N.Y.

[21] Appl. No.: 11,970

[22] Filed: Feb. 14, 1979

[30] Foreign Application Priority Data

Feb. 24, 1978 [CH] Switzerland .................. 2036/78

[51] Int. Cl.$^2$ .................. C02B 1/60; C02C 5/08
[52] U.S. Cl. .................. 210/688; 210/502; 528/341; 528/254; 528/289
[58] Field of Search .................. 210/24, 28, 36, 37 R, 210/37 B, 40, 502, 506–508

[56] References Cited

U.S. PATENT DOCUMENTS

| | | | |
|---|---|---|---|
| 2,882,185 | 4/1959 | Valko et al. | 427/342 |
| 3,305,493 | 2/1967 | Emmons | 162/164 E P |
| 3,311,594 | 3/1967 | Eade, Jr. | 162/164 E P |
| 3,979,285 | 9/1976 | Wegmuller et al. | 210/36 |
| 3,997,483 | 12/1976 | Wurster et al. | 210/36 X |
| 4,026,796 | 5/1977 | Wegmuller et al. | 210/37 R X |
| 4,079,001 | 3/1978 | Haase et al. | 210/36 |

FOREIGN PATENT DOCUMENTS

| | | |
|---|---|---|
| 1010736 | 6/1957 | Fed. Rep. of Germany . |
| 841554 | 7/1960 | United Kingdom . |
| 878985 | 10/1961 | United Kingdom . |

*Primary Examiner*—Theodore A. Granger
*Attorney, Agent, or Firm*—Prabodh I. Almaula

[57] ABSTRACT

A process for removing heavy-metal ions from aqueous solutions, particularly from effluents. The process comprises bringing the aqueous solutions into contact with a water-insoluble adsorbent which has been produced from:

(1) a basic polynitrogen compound capable of being acylated;
(2) an aliphatic or araliphatic carboxylic acid containing mobile substituents or a multiple bond capable of undergoing addition; and
(3) a crosslinking compound which contains at least two reactive substituents and which is different from component (2).

18 Claims, No Drawings

PROCESS FOR REMOVING HEAVY-METAL IONS FROM AQUEOUS SOLUTIONS

The present invention relates to a process for removing heavy-metal ions from aqueous solutions, particularly from effluents. The novel process comprises bringing the aqueous solutions into contact with a water-insoluble adsorbent which has been produced from (1) a basic polynitrogen compound capable of being acylated;
(2) an aliphatic or araliphatic carboxylic acid containing mobile substituents or a multiple bond capable of undergoing addition; and
(3) a crosslinking compound which contains at least two reactive substituents and which is different from component (2).

Various chelating products to adsorb heavy metals in effluents have already been developed. Thus, for example, the method of removing or trapping heavy-metal ions from liquids by use of an amphoteric chelating cellulose material is known. It has now been found that, surprisingly, heavy-metal ions can be selectively adsorbed by using a cellulose-free adsorbent of the type mentioned initially. The adsorbent to be used according to the invention has a high and selective adsorption capacity for heavy-metal ions, an excellent chelate-forming capacity and chelate stability and can moreover be regenerated.

Compared with the adsorbents based on cellulose, the adsorbents according to the invention are distinguished by having, with constant kinetics, a higher capacity.

By virtue of the process according to the invention, the metal content in the effluent can be reduced to practically negligible amounts of down to only 2.5 ppm, in some cases even of 0.01 ppm, so that consequently the effluent treated therewith can be discharged as being free from heavy-metal ions or heavy-metal-oxide ions.

The effluents to be treated by the process according to the invention include various industrial effluents containing ions of metals having a normal electrode potential as a rule greater than $-1.5$ V, preferably between $-1.0$ and $+0.85$ V, at 25° C. Such metal ions are for example $Cd^{++}$, $Cu^{++}$, $Ni^{++}$, $Sn^{++}$, $Pb^{++}$, $Hg^{++}$, $Ag^+$, $UO_2^{++}$, $Fe^{+++}$, $Cr^{+++}$ and $Co^{+++}$.

The removal of the metal ions is advantageously performed at 10° to 100° C. It is however preferably performed at between 20° and 70° C. The purification of the effluents can if required be performed under pressure or vacuum. The pH value of the effluents can vary within wide limits, for example between 2 and 12. However, pH corrections, for example to a value of 2 to 9, especially 3 to 7, can, depending on the nature of the adsorbent, facilitate or accelerate the purification process.

The treatment of the effluents can be carried out discontinuously, semicontinuously or continuously. In accordance with the invention, the following methods of carrying out the treatment are essentially suitable:

(a) the so-called stirring process in which the water to be purified is stirred with the adsorbent in a vessel or series of vessels and then separated;
(b) the so-called fluidised bed process in which the adsorbent is kept in a suspended state by the flow of the liquor to be purified; and
(c) the so-called fixed bed process in which the liquor to be purified is passed through an adsorbent arranged in a filter-like manner.

If, of these three process variants, the fixed bed process (c) is used, the following three apparatus variants are particularly suitable:

1. the treatment apparatus is rigidly connected to the adsorber unit;
2. the adsorber unit is mobile and can be coupled as required to any treatment apparatus; and
3. the effluents originating from the treatment liquors are combined in a suitable container, and the whole is then passed through the adsorbent.

The adsorbents according to the invention can be produced by reaction or mixing and reaction of the three components in any chosen sequence.

These products are preferably produced by reacting the reaction product from the components (1) and (2) with the component (3).

The adsorbents can also be produced by reacting the reaction product or a mixture from the components (1) and (3) with the component (2).

The adsorbent usable according to the invention is advantageously formed from 1 base mol of the component (1),
0.05 to 0.8 mol, preferably 0.4 to 0.7 mol, of the component (2), and
0.05 to 1.0 mol, preferably 0.1 to 0.5 mol, of the component (3).

By base mol is meant the molecular weight of the recurring structural element within the polymer molecule.

For producing the adsorbents according to the invention, suitable polynitrogen compounds (1) capable of being acylated are essentially oligomers or polymers which contain amino groups capable of being acylated, that is to say, primary or secondary amino groups.

As oligomeric compounds containing primary and secondary amino groups, there may be mentioned in particular alkylene polyamines having a total of 4 to 50 carbon atoms and 3 to 12 amino groups.

The alkylene polyamines are for example diethylenetriamine, triethylenetetramine, dipropylenetriamine, tripropylenetetramine, dihydroxydipropylenetriamine, dibutylenetriamine, tributylenetetramine, tetrabutylenepentamine, dipentylenetriamine, tripentylenetetramine, tetrapentylenepentamine, dihexamethylenetriamine, trihexamethylenetetramine and tetrahexamethylenepentamine.

As oligomers, it is possible also to use addition products of alkylenepolyamines and acrylic acid-$C_1$–$C_6$-alkyl ester or methacrylic acid-$C_1$–$C_6$-alkyl ester, as is described for example in U.S. Pat. No. 3,305,493.

Polymers containing primary and/or secondary amino groups are preferably used as the component (1).

Suitable basic polymers are in particular the polyalkyleneimines which advantageously have an average molecular weight (MW) of 1,000 to 200,000, preferably 10,000 to 100,000. These polymers have as a rule a Brookfield viscosity at 20° C. of 500 to 20,000 centipoises (cp). The polyalkyleneimines are preferably derived from alkyleneimines having 2 to 4 carbon atoms. Suitable alkyleneimines are in particular ethyleneimine, propyleneimine, 1,2-butyleneimine and 2,3-butyleneimine. Of all the polyalkyleneimines, polyethyleneimine is preferably used. Of special practical importance are polyethyleneimines which have an average molecular weight of 10,000 to 100,000, particularly 30,000 to 40,000.

Reaction products of halogenohydrins or dihalogenohydrins with alkylene- or polyalkylenepolyamines or -imines, for example reaction products of epichlorohydrin with diethylenetriamine, dipropylenetriamine or triethylenetetramine or with polyethyleneimine, can also be used as basic polymers capable of being acylated. Basic reaction products of this type are described for example in the German Auslegeschrift No. 1,010,736.

Soluble basic polyamides which are produced by a condensation reaction of polycarboxylic acids containing 2 to 10 carbon atoms, preferably dibasic carboxylic acids, for example adipic acid, or functional derivatives thereof, for example esters, amides or anhydrides, and polyamines, in particular polyalkylenepolyamines, such as are described for example in U.S. Pat. No. 2,882,185, are also suitable as basic, nitrogen-containing polymers capable of being acylated.

Of particular practical interest as basic polymers capable of being acylated are also the polyamide polyamines which are obtained by reacting polymerised, preferably dimerised to trimerised, fatty acids with polyamines, advantageously in a ratio such that the polyamide resin formed has an amine value in the range of approximately 200 to 650 mg of potassium hydroxide per gram of polyamidepolyamine.

Aromatic polyamines or, in particular, aliphatic polyamines, which can also contain heterocyclic structures, for example imidazolines, can also be employed as polyamines which can be used for producing the basic polyamides. The aliphatic polyamines are preferably alkylenepolyamines having a total of 2 to 8 carbon atoms and 2 to 5 amino groups.

Polymeric fatty acids, which are advantageously present in polyamides of this type, are obtained by polymerising one or more unsaturated, long-chain, aliphatic or aromatic-aliphatic acids or esters or other derivatives thereof, which can be easily converted into the acid. Suitable examples of such polymeric fatty acids are described in British Pat. Nos. 878,985 and 841,554.

The polyamidepolyamines are preferably produced from polyalkylenepolyamines and aliphatic, ethylenically unsaturated dimeric to trimeric fatty acids which are derived from monocarboxylic acids having 16 to 22 carbon atoms. These monocarboxylic acids are fatty acids with at least one, preferably 2 to 5, ethylenically unsaturated bonds. Representatives of this class of acids are for example: oleic acid, hiragonic acid, eleostearic acid, licanic acid, arachidonic acid, clupanodonic acid and, in particular, linoleic and linolenic acid. These fatty acids can be isolated from natural oils, in which they occur, above all, as glycerides.

Dimerised to trimerised linoleic or linolenic acids are particularly suitable. The commercial products of these acids contain as a rule 75 to 95 percent by weight of dimeric acid, 4 to 22 percent by weight of trimeric acid and 1 to 3 percent by weight of monomeric acid.

A typical representative of the polyamidepolyamines is obtained from polymerised linoleic acid/linolenic acid and diethylenetriamine and has an amine value of 350 to 400 mg of KOH/g.

Further basic polyamide resins capable of being acylated as for example the products obtained by reacting halogenohydrins, for example epichlorohydrin, with aminopolyamides from polyalkyleneamines and aliphatic dicarboxylic acids containing 2 to 10 carbon atoms, such as are described for example in U.S. Pat. No. 3,311,594.

Also basic polyamides which are obtained by condensation polymerisation at high temperature from a reaction mixture containing polymeric fatty acids (produced according to British Pat. Nos. 878,985 and 841,544), monomeric fatty acids and lower polyalkylenepolyamines can be used as component (1).

The component (2) required for producing the adsorbents usable according to the invention serves to form the chelating amino acid group. For this purpose, there is advantageously firstly added the basic polymeric component (1) with the component (2) containing carboxyl groups. Aliphatic or araliphatic carboxylic acids or the alkali metal salts thereof, which contain mobile halogen atoms or multiple bonds capable of undergoing addition, particularly C—C double bonds, can be advantageously used as component (2). Suitable mobile halogen atoms are for example bromine, fluorine or preferably chlorine, which owe their mobility for example to the bond to $\alpha$- or $\beta$-carbon atoms of the carboxylic acids.

Suitable carboxylic acids containing mobile halogen atoms are halogenoacetic acids, which are unsubstituted or substituted in the $\alpha$-position by lower alkyl, lower alkoxy, hydroxy-lower-alkyl, lower alkoxy-lower alkyl, lower alkylthio-lower alkyl, carboxyl-lower-alkyl, phenyl or benzyl. The acid radical is preferably in the salt form, for example as the alkali metal salt, such as the sodium or potassium salt.

Examples of suitable halogenocarboxylic acids are chloroacetic acid, bromoacetic acid, $\alpha$-chloropropionic acid, $\beta$-chloro- or $\beta$-bromopropionic acid, $\alpha$-chloro-$\beta$-hydroxypropionic acid, chlorosuccinic acid, $\alpha$-phenyl-$\alpha$-chloro- or -$\alpha$-bromoacetic acid, $\beta$-bromo-$\beta$-phenyl-propionic acid or $\alpha$-chloro-$\beta$-methylthio-propionic acid, as well as $\alpha$- or $\beta$-chloro- or -bromoacrylic acid, $\alpha,\beta$-dichloro- or -dibromoacrylic, $\alpha,\beta$- or $\gamma$-chloro- or -bromocrotonic acid, $\alpha,\beta$-dichlorocrotonic acid, chloro- or bromomaleic or -fumaric acid. Chloroacetic acid is particularly preferred. A suitable multiple bond capable of undergoing addition is for example the C—C double bond or C—C triple bond, which is in the position adjacent to the carboxyl group. Examples of carboxylic acids capable of undergoing addition are acrylic acid, methacrylic acid, crotonic acid, propionic acid, maleic acid or fumaric acid. Mobile substituents in the component (2) can also be OH groups as well as etherified or esterified forms thereof.

The component (3) can be monomeric or polymeric compounds which possess crosslinking properties and which can form a chemical bond either with the reaction product from the components (1) and (2) or directly with the basic polymeric compound (1). These compounds containing at least two functional groups owe their reactivity to a multiple bond which is capable of undergoing addition, an epoxy group, an aziridine group, a substituent which can be split off as a tertiary amine, or preferably a substituent which can be split off as an anion, which factors can also occur in combination. They contain for example the grouping

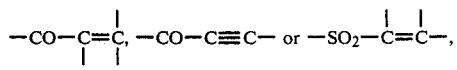

or the isocyanate or isothiocyanate group, as a multiple bond capable of undergoing addition. The component (3) can contain, as groups which can be split off, quaternary ammonium groups which are split off as tertiary amines, for example the trimethylammonium or pyridinium group, or sulfonium groups. However, component (3) contains substituents with a radical which can be split off as an anion, preferably with mobile halogen atoms, as a preferred reactive group. Radicals of this type which can be split off as an anion owe their mobility for example to the influence of electrophilic groups, such as the —CO— or —SO$_2$— group in saturated, aliphatic radicals. They can also owe their mobility to the influence of a quaternary nitrogen atom, such as in the group

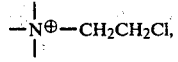

or, in aromatic radicals, to the influence of electrophilic groups in the o-position and p-position, for example nitro groups, hydrocarbon-sulfonyl groups or hydrocarbon-carbonyl groups, or to the bond to a ring carbon atom which is adjacent to a tertiary ring nitrogen atom, such as in halogenotriazine radicals or halogenopyrimidine radicals.

Cyclic carbonic acid imide-halides and in particular halogenodiazine or halogenotriazine compounds containing at least two mobile substituents have proved especially advantageous as component (3).

The cyclic carbonic acid imide-halides used here are component (3) are advantageously:

(a) s-triazine compounds with at least two halogen atoms bonded to carbon atoms, such as, for example, cyanuric chloride, cyanuric fluoride and cyanuric bromide, as well as the primary condensation products of cyanuric fluoride or cyanuric chloride or cyanuric bromide and, for example, water, ammonia, amines, alkanols, alkylmercaptans, phenols or thiophenols;

(b) pyrimidines with at least two reactive halogen atoms, such as 2,4,6-trichloro-, 2,4,6-trifluoro- or 2,4,6-tribromopyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxylic acid amide or sulfonic acid amide group, but preferably by halogen, such as, for example, chlorine, bromine or fluorine: particularly suitable halogenopyrimidines are 2,4,6-trichloro- and 2,4,5,6-tetrachloropyrimidine;

(c) halogenopyrimidinecarboxylic acid halides, such as, for example, dichloropyrimidine-5- or -6-carboxylic acid chloride;

(d) 2,3-dihalogeno-quinoxaline-, 2,4-dihalogeno-quinazoline- or 1,4-dihalogeno-phthalazine-carboxylic acid halides or -sulfonic acid halides, such as 2,3-dichloro-quinoxaline-6-carboxylic acid chloride or -6-sulfonic acid chloride, 2,4-dichloroquinazoline-6- or -7-carboxylic acid chloride or 1,4-dichlorophthalazine-6-carboxylic acid chloride or bromide;

(e) 2-halogeno-benzo-thiazole- or -oxazole-carboxylic acid halides or -sulfonic acid halides, such as 2-chlorobenzothiazole- or -oxazole-5- or -6-carboxylic acid chloride or -5- or -6-sulfonic acid chloride; and (f) halogeno-6-pyridazonyl-1-alkanoyl halides or -1-benzoylhalides, such as, for example, 4,5-dichloro-6-pyridazonyl-1-propionyl chloride or -1-benzoyl chloride.

Further compounds, containing at least two reactive substituents, which can be employed as component (3) are, for example:

(g) anhydrides or halides of aliphatic, α,β-unsaturated monocarboxylic or dicarboxylic acids with preferably 3 to 5 carbon atoms, such as maleic anhydride, acrylyl chloride, methacrylyl chloride and propiolyl chloride;

(h) anhydrides or halides of aliphatic monocarboxylic or dicarboxylic acids, with preferably 3 to 10 carbon atoms, or aromatic carboxylic acids, which contain mobile halogen atoms, such as, for example, chloroacetyl chloride, β-chloropropionyl chloride, α,β-dibromopropionyl chloride, α-chloro- or β-chloro-acrylyl chloride, chloromaleic anhydride or β-chlorocrotonyl chloride, or fluoro-nitro- or chloro-nitrobenzoyl halides or -benzenesulfonyl halides in which the fluorine or chlorine atom is in the o-position and/or p-position to the nitro group;

(i) carboxylic acid N-methylolamides or reactive functional derivatives of these methylol compounds: carboxylic acid N-methylolamides which can be used are, above all, N-methylol-chloroacetamide, N-methylol-bromoacetamide, N-methylol-α,β-dichloro- or -dibromo-propionamide, N-methylol-acrylamide or N-methylol-α-chloro- or -α-bromo-acrylamide; and possible reactive derivatives of the carboxylic acid N-methylolamides are, for example, the corresponding N-chloromethyl- or N-bromomethyl-amides;

(j) optionally etherified N-methylolureas or N-methylol-melamines, such as, for example, N,N-dimethylolurea, N,N'-dimethylolurea dimethyl ether, N,N'-dimethylol-ethylene- or -propylene-urea, 4,5-dihydroxy-N,N'-dimethylol-ethylene-urea or -dimethyl ether, and di-bis-hexamethylolmelamine, trimethylolmelamine dimethyl ether, pentamethylolmelamine di-bis-trimethyl ether or hexamethylolmelamine penta- or hexamethyl ether; and (k) condensation products of diarylalkanes containing at least one phenolic hydroxyl group and halogenohydrins, for example the diepoxide from 2,2-bis-(4'-hydroxyphenyl)-propane and epichlorohydrin, and also glycerol triglycidyl ether, toluylenediisocyanate or trisacryloyl-hexahydro-s-triazine.

Lower alkyl and lower alkoxy in the definition of the radicals of the components (2) and (3) in question are in general those groups which contain 1 to 5, in particular 1 to 3, carbon atoms, such as methyl, ethyl, n-propyl, isopropyl, n-butyl, sec-butyl or amyl and, respectively, methoxy, ethoxy or isopropoxy. Halogen in connection with all the above substituents is for example fluorine, bromine or preferably chlorine.

Preferred adsorbents can be produced by reacting a condensate from a polyethyleneimine having a mean molecular weight of 10,000–100,000, particularly 30,000 to 40,000, and a halogenoacetic acid of the type mentioned initially, unsubstituted or substituted in the α-position, especially chloroacetic acid, with a halogenodiazine or -triazine compound containing at least two mobile substituents, particularly cyanuric chloride.

The reaction conditions for producing the adsorbents according to the invention are to be selected, depending on the sequence of the starting materials used, to ensure that a premature exchange of the mobile substituents does not occur either as a result of pH value of the reaction medium being too high or as a result of temperatures being too high. The reaction is therefore preferably performed in a dilute aqueous medium under the mildest possible conditions regarding temperature and pH value, that is to say, depending on the stability and reactivity of the components (1) and (2), at temperatures up to 100° C. and at pH values from 3 to 11 inclusive, preferably in the presence of agents which neutralise mineral acid, for example sodium acetate, sodium carbonate or sodium hydroxide. Depending on the properties of the components, the reactions can be carried out in solution or in fine dispersions, for example in suspensions or emulsions, optionally with the aid of inert organic solvents which can be easily removed, such as lower aliphatic ketones.

Depending on the type of metal ions to be separated out, the amount of adsorbent to be used to remove the metal ions can vary within wide limits. The adsorbent is used in large excesses up to 100 times the theoretical amount or in practically stoichiometric amounts depending on whether the decisive factor is the final content of metal ions in the water, which has to be attained, or the economical utilisation of the capacity of the adsorbent.

By suitable choice of adsorbent, it is possible to remove up to 95%, in some cases even virtually 100%, of metal ions from the effluents. In cases where it is not possible to effect complete removal of the metal ions by a single treatment of the effluents with the adsorbent, it is recommended that the purification process be repeated.

In the following Manufacturing Instructions and Examples, percentages are in all cases percent by weight.

MANUFACTURING INSTRUCTIONS

Instruction 1

(a) 258 g of polyethyleneimine (50% aqueous solution) having a mean molecular weight of 30,000–40,000 and 500 ml of water are placed at room temperature into the reaction vessel, and 175 g of sodium monochloroacetate is added with stirring. The mixture is then heated within 40 minutes to 80° C. and held for 8 hours at a pH value of 8.5–9.0 by the addition of 3 N sodium hydroxide solution. The reaction mixture is subsequently cooled to room temperature, and the pH value is adjusted to 7.0 with 96 ml of 10 N sulfuric acid. Water is then added to the reaction product up to a volume of 1410 ml.

(b) 18.44 g of cyanuric chloride dissolved in 115 ml of acetone is added dropwise at room temperature in the course of 10 minutes, with stirring, to 235 ml of the solution of the condensation product obtained according to (a). The white suspension is afterwards further stirred for 4 hours at a pH value of 1. The product is filtered off, washed with 100 ml of acetone and 500 ml of water, and dried at 40° C. to thus obtain 42.8 g of a light-yellow adsorbent having a nitrogen content of 17%.

Instruction 2

(a) 136.3 g of sodium monochloroacetate is added at room temperature, with stirring, to 200 g of polyethyleneimine (50% aqueous solution) having a mean molecular weight of 30,000–40,000 and 500 ml of water. The mixture is then heated to 80° C., and subsequently held for 2½ hours at a pH value of 9–10 by the addition of 5 N sodium hydroxide solution. The reaction mixture is thereupon cooled to room temperature, and the pH value is adjusted to 7 with 10 N sulfuric acid. The volume of the reaction product is then made up to 1200 ml with water.

(b) 7 g of N,N-dimethylolurea is mixed with 60 ml of the reaction product obtained according to Instruction 2 (a). The white suspension is then brought to a pH value of 4.5 with 37% hydrochloric acid, and is heated with stirring to 150° C., in the course of which the water is removed and the mixture becomes hard. After a further condensation time of 10 minutes, the yield is 20 g of a brownish-yellow condensation product having a nitrogen content of 15.3%.

Instruction 3

6.35 g of trimethylolmelamine is mixed with 60 ml of the reaction product obtained according to Instruction 2 (a). The pH value of the white suspension is then adjusted to 4.5 with 37% hydrochloric acid, and the suspension is subsequently heated to 150° C. with stirring, in the course of which the water is removed and the mixture becomes solid. The mixture is afterwards held at 60° C. for 5 hours. There is thus obtained 19.9 g of a brownish-yellow condensation product having a nitrogen content of 18.85%.

Instruction 4

5 g of toluylenediisocyanate is mixed with 60 ml of the reaction product obtained according to Instruction 2 (a), and the mixture is heated with stirring to 150° C. The reaction product froths up during the condensation reaction and becomes solid. The yield is 19.5 g of a yellowish product having a nitrogen content of 11.8%.

Instruction 5

17.2 g of polyethyleneimine (50% aqueous solution) having a mean molecular weight of 30,000–40,000, 11.6 g of maleic acid and 9.22 g of cyanuric chloride are heated with stirring to 150° C., in the course of which the water is evaporated and the mixture becomes solid. After a further condensation time of 5 minutes, the yield is 25.6 g of a yellowish product having a nitrogen content of 15.8%.

Instruction 6

60 ml of the reaction product obtained according to Instruction 2 (a) is mixed with 7.72 g of trisacryloylhexahydro-s-triazine, and the pH value is adjusted to 5.5 with 37% hydrochloric acid. The mixture is thereupon heated to 150° C., in the process of which the water evaporates and the mixture becomes solid. The yield is 21.9 g of a product having a nitrogen content of 11.4%.

Instruction 7

60 ml of the reaction product obtained according to Instruction 2 (a) is mixed with 7.72 g of trisacryloylhexahydro-s-triazine and 45 ml of 1 N sodium hydroxide solution. The white suspension having a pH value of 9.1 is then heated to 150° C. with stirring, and is held at this temperature for 10 minutes, with the water evaporating off and the mixture becoming solid. The yield is 22.5 g of a yellowish condensation product having a nitrogen content of 12.3%.

Instruction 8

60 ml of the reaction product produced according to Instruction 2 (a) is mixed with 6 g of glycerol triglycidyl ether, whereupon the pH value of the mixture is adjusted to pH 9 sodium hydroxide solution. The mixture is then heated to 130° C., in the course of which the water evaporates off and the mixture solidifies. After a further reaction time of 10 minutes, the yield is 21.2 g of a brownish product having a nitrogen content of 10.25%.

Instruction 9

17.2 g of polyethyleneimine (50% aqueous solution) having a mean molecular weight of 5,000–10,000, 11.6 g of sodium monochloroacetate, 9.22 g of cyanuric chloride and 10 ml of 30% sodium hydroxide solution are mixed together and the mixture is heated to 150° C. A strongly frothing reaction occurs, with the mixture becoming hard and brittle after a condensation time of 35 seconds. The yield is 31.2 g of a yellowish condensation product having a nitrogen content of 12.6%.

Instruction 10

A mixture of 17.2% g of polyethyleneimine (50% aqueous solution) having a mean molecular weight of 30,000–40,000, 11.2 g of $\beta$-chloropropionic acid and 9.22 g of cyanuric chloride is adjusted with a sodium hydroxide solution to pH 9.8, and then heated to 150° C., in the course of which the water evaporates off and the mixture becomes solid. The yield after a further condensation time of 5 minutes is 30.1 g of a yellowish product having a nitrogen content of 14.25%.

Instruction 11

A mixture of 31.4 g of a reaction product from ethylacrylate and diethylenetriamine, 11.7 g of sodium monochloroacetate, 9.22 g of cyanuric chloride and 11 ml of 30% sodium hydroxide solution is heated with stirring to 150° C. and then condensed for 22 minutes. There is thus obtained 51 g of a yellowish product having a nitrogen content of 18.25%.

Instruction 12

A reaction product from 8.6 g of polyethyleneimine having a mean molecular weight of 30,000–40,000 and 9.2 g of cyanuric chloride is mixed with 11.7 g of sodium monochloroacetate in 15 g of water, whereupon the pH value is adjustd to 8.5–9.0 with a sodium hydroxide solution. The alkaline mixture is then heated at 120° C. for 15 minutes. The yield is 29.9 g of a yellowish, water-insoluble product having a nitrogen content of 12.2%.

Instruction 13

A mixture of 16.75 g of a reaction product from equimolar amounts of adipic acid and tetraethylenepentamine, 8.75 g of sodium monochloroacetate and 6.9 g of cyanuric chloride is adjusted with 30% sodium hydroxide solution to pH 8.7, and is then heated with stirring at 150° C., in the course of which the water evaporates off and the mixture becomes solid. The yield is 34.1 g of a brownish product having a nitrogen content of 15.1%.

Instruction 14

19.0 g of tetraethylenepentamine (50% aqueous solution), 11.7 g of sodium monochloroacetate and 9.22 g of cyanuric chloride are mixed together, and the mixture is heated to 150° C., and condensed for 8 minutes at 150° C. to yield 28 g of a water-insoluble product having a nitrogen content of 14.5%.

Instruction 15

A mixture of 17.2 g of polyethyleneimine (50% aqueous solution) having a mean molecular weight of 30,000–40,000, 11.2 g of $\alpha$-chloropropionic acid and 9.22 g of cyanuric chloride is adjusted with a sodium hydroxide solution to pH 9.8, and then heated to 150° C., in the course of which the water evaporates off and the mixture becomes solid. The yield is 29.7 g of a yellowish product having a nitrogen content of 13.3%.

Instruction 16

23.05 g of cyanuric chloride dissolved in 140 ml of acetone is added dropwise at room temperature in the course of 10 minutes, with stirring, to 235 ml of the solution of the condensation product obtained according to Instruction 1 (a). The white suspension is then further stirred for 4 hours at a pH value of 1. The product is filtered off, washed with 500 ml of water and dried at 40° C. The yield is 47.5 g of an adsorbent having a nitrogen content of 18.4%.

EXAMPLE 1

1 liter of a metallic solution which has been adjusted to a pH value of 3 and which contains 50 mg of metal in dissolved form is placed into a reaction vessel fitted with stirrer. 0.5 g of the adsorbent produced according to Instruction 1 (b) is added in each case to the liquor. After an adsorption time of 2 minutes, 60 minutes and 24 hours, respectively, a sample is taken and filtered, and the corresponding metal ion concentration in the filtrates is determined. The results of the measurements of the respective concentrations are summarised in Table 1.

TABLE 1

| Metal ions | Temp. (°C.) | Residual metal-ion concentration in mg/l after | | |
|---|---|---|---|---|
| | | 2 minutes | 60 minutes | 24 hours |
| mercury | 25 | 6.75 | 2.5 | 2.5 |
| copper | 25 | 30.5 | 13 | 13 |
| mercury | 80 | — | 2.1 | 0.01 |

EXAMPLE 2

1 liter of a mercury solution, which has been adjusted to a pH value of 6 and which contains 100 mg of mercury in ion form, is placed into a reaction vessel fitted with stirrer. 0.2 g of the adsorbent produced according to Instructions 2 to 15 is added in each case to the liquor. A sample is taken in each test after an adsorption time of 10 minutes, 60 minutes and 24 hours, respectively, and the sample is filtered through a glass filter. The corresponding metal-ion concentrations in the filtrates are determined and are listed in Table 2.

TABLE 2

| Adsorbent produced according to Instruction | Residual metal ion concentration in mg/l after | | |
|---|---|---|---|
| | 10 minutes | 60 minutes | 24 hours |
| 2 | 82 | 72 | 69 |
| 3 | 79 | 63 | 54 |
| 4 | 82 | 64 | 54 |
| 5 | 67 | 60 | 64 |
| 6 | 81 | 65 | 50 |
| 7 | 84 | 69 | 42 |
| 8 | 85 | 68 | 63 |
| 9 | 95 | 68 | 42 |
| 10 | 83 | 58 | 46 |
| 11 | 97 | 95 | 90 |
| 12 | 80 | 66 | 59 |
| 13 | 97 | 94 | 88 |
| 14 | 76 | 65 | 58 |

TABLE 2-continued

| Adsorbent produced according to Instruction | Residual metal ion concentration in mg/l after | | |
|---|---|---|---|
| | 10 minutes | 60 minutes | 24 hours |
| 15 | 90 | 63 | 48 |

EXAMPLE 3

One liter of a metallic solution, which has been adjusted to have a pH value of 6 and which contains 100 mg of metal in dissolved form, is placed into a reaction vessel fitted with stirrer. 0.2 g of the adsorbent produced according to Instructions 3 to 7 and 10 is added in each case to the liquor. A sample is taken in each test after an adsorption time of 10 minutes, 60 minutes and 24 hours, respectively, and the sample is filtered through a glass filter. The corresponding metal-ion concentrations in the filtrates are determined and are listed in Table 3.

| Adsorbent produced according to Instruction | Metal ions | Residual metal ion concentration in mg/l after | | |
|---|---|---|---|---|
| | | 10 minutes | 60 minutes | 24 hours |
| 3 | Zn | 98 | 87 | 76 |
| 3 | Cd | 95 | 90 | 90 |
| 3 | Cu | 95 | 91 | 90 |
| 4 | Zn | 95 | 86 | 75 |
| 4 | Cd | 92 | 89 | 89 |
| 4 | Cu | 93 | 90 | 89 |
| 5 | Zn | 98 | 92 | 80 |
| 5 | Cd | 95 | 95 | 95 |
| 5 | Cu | 95 | 92 | 92 |
| 6 | Zn | 95 | 87 | 83 |
| 6 | Cd | 95 | 94 | 92 |
| 6 | Cu | 96 | 90 | 88 |
| 7 | Zn | 88 | 85 | 78 |
| 7 | Cd | 95 | 94 | 90 |
| 7 | Cu | 94 | 90 | 88 |
| 10 | Zn | 95 | 90 | 82 |
| 10 | Cd | 95 | 95 | 95 |
| 10 | Cu | 95 | 90 | 90 |

EXAMPLE 4

2 g of an adsorbent produced according to Instruction 16 is placed into a column having a cross-sectional area of 3.14 cm$^2$ and a height of 3 cm. 6 liters of a mercury solution, which has been adjusted to a pH value of 3 and which contains 100 mg of mercury in dissolved form per liter, is passed through the column at a mean rate of 200 filling volumes/hour. A sample of the eluates is taken at regular intervals, whereupon the total adsorbed amount of mercury is determined. The adsorbent is then regenerated by means of 50 ml of 1 N nitric acid, and the mercury concentration in the eluates is determined. The adsorption column is afterwards thoroughly washed with water, and the passage of the mercury solution is repeated 4 times in the manner described above. The regenerated amounts and non-regenerated amounts are shown in Table 4.

TABLE 4

| Mercury ions in mg | Cycle | | | | |
|---|---|---|---|---|---|
| | 1 | 2 | 3 | 4 | 5 |
| adsorbed | 597 | 518 | 486 | 492 | 523 |
| regenerated not | 520 | 473 | 458 | 418 | 480 |

TABLE 4-continued

| Mercury ions in mg | Cycle | | | | |
|---|---|---|---|---|---|
| | 1 | 2 | 3 | 4 | 5 |
| regenerated | 77 | 45 | 28 | 74 | 43 |

What is claimed is:

1. A process for removing heavy-metal ions from an aqueous solution, which process comprises bringing the aqueous solution in contact with a water-insoluble adsorbent which has been produced from
   (1) a basic polynitrogen compound capable of being acylated;
   (2) an aliphatic or araliphatic carboxylic acid containing mobile substituents or a multiple bond capable of undergoing addition; and
   (3) a crosslinking compound which contains at least two reactive substituents and which is different from component (2).

2. A process according to claim 1, wherein the adsorbent has been produced by reacting a reaction product of the components (1) and (2) with the component (3).

3. A process according to claim 1, wherein the adsorbent has been produced by reacting a reaction product of the components (1) and (3) with the component (2), or by reacting a mixture of the components (1) and (3) with the component (2).

4. A process according to claim 1 wherein the component (1) is an oligomeric or polymeric compound containing primary or secondary amino groups.

5. A process according to claim 4, wherein the component (1) is a polyalkyleneimine having a mean molecular weight of 1,000 to 200,000.

6. A process according to claim 5, wherein the polyalkyleneimine is a polyethyleneimine having a mean molecular weight of 10,000 to 100,000.

7. A process according to claim 1, wherein the component (1) is a polyamidopolyamine from a polycarboxylic acid having 2 to 10 carbon atoms and a polyamine.

8. A process according to claim 1, wherein the component (1) is a polyamidopolyamine from a polymeric fatty acid and a polyamine.

9. A process according to claim 1, wherein the component (1) is a polyamide resin which has been obtained by reacting epihalogenohydrin with a aminopolyamide from a polyalkyleneamine and an aliphatic dicarboxylic acid having 2 to 10 carbon atoms.

10. A process according to claim 1, wherein the component (2) is a halogenoacetic acid which is unsubstituted or substituted in the α-position by the lower alkyl, lower alkoxy, hydroxy-lower alkyl, lower alkoxy-lower alkyl, lower alkyl-thio-lower alkyl, carboxy-lower alkyl, phenyl or benzyl.

11. A process according to claim 1, wherein the component (2) is chloroacetic acid.

12. A process according to claim 1 wherein the component (3) is a crosslinking compound selected from the group consisting of
   (a) a halogeno-diazine or halogenotriazine containing at least two mobile substituents,
   (b) a 2-halogeno-benzothiazole-carboxylic acid halide or -sulphonic acid halide or a 2-halogeno-benzoxazole -carboxylic acid halide or -sulphonic acid halide,
   (c) a halogeno-6-pyridazonyl-1-alkanoyl halide or a halogeno-6-pyridazonyl-1-benzoyl halide, (d) an anhydride or halide of an aliphatic, α,β,- unsaturated monocarboxylic or dicarboxylic acid, (e) an anhydride or halide of an aliphatic monocarboxylic or dicarboxylic acid or of an aromatic carboxylic acid containing two mobile halogen atoms, (f) a carboxylic acid N-methylolamide, N-chloromethylamide or N-bromomethylamide, (g) an unetherified or etherified N-methylolurea or N-methylolmelamine and (h) a condensation product of a diarylalkane containing at least one phenolic hydroxyl group and a halogenohydrin, or a glycerol triglycidyl ether, a toluylene diisocyanate or a tris-acryloyl-hexahydro-s-triazine.

13. A process according to claim 1, wherein the component (3) is a halogenodiazine or halogenotriazine compound containing at least two mobile substituents.

14. A process according to claim 13 wherein component (3) is a halogenodiazine or halogenotriazine containing at least two mobile substituents selected from the group consisting of (i) a s-triazine compound having at least two halogen atoms bonded to ring carbon atoms, (ii) a pyrimidine compound having at least two reactive halogen atoms, (iii) a halogenopyrimidinecarboxylic acid halide and (iv) a dihalogeno-quinoxaline-carboxylic acid halide or -sulphonic acid halide, or a dihalogeno-quinazoline-carboxylic acid halide or -sulphonic acid halide, or a dihalogeno-phthalazine-carboxylic acid halide or -sulphonic acid halide.

15. A process according to claim 14, wherein the component (3) is an s-triazine compound having at least two halogen atoms bonded to ring carbon atoms.

16. A process according to claim 15, wherein the component (3) is cyanuric chloride.

17. A process according to claim 1, wherein the adsorbent has been produced by reacting a condensation product from polyethyleneimine having a mean molecular weight of 10,000 to 100,000 and a halogenoacetic acid, which is unsubstituted or substituted in the α-position by lower alkyl, lower alkoxy, hydroxy-lower-alkyl, lower alkoxy-lower alkyl, lower alkylthio-lower alkyl, carboxy-lower alkyl, phenyl or benzyl, with a halogenodiazine compound or halogenotriazine compound containing at least two mobile substituents.

18. A process according to claim 17, wherein the adsorbent has been produced by reacting a condensation product, formed from a polyethyleneimine having a mean molecular weight of 30,000 to 40,000 and chloroacetic acid, with cyanuric chloride.

* * * * *